US009530181B2

(12) United States Patent
Schultz et al.

(10) Patent No.: US 9,530,181 B2
(45) Date of Patent: *Dec. 27, 2016

(54) COMPUTER SYSTEM FOR CONTINUOUS OBLIQUE PANNING

(71) Applicant: Pictometry International Corp., Rochester, NY (US)

(72) Inventors: Stephen L. Schultz, West Henrietta, NY (US); Chris Schnaufer, Rochester, NY (US); Frank Giuffrida, Honeoye Falls, NY (US)

(73) Assignee: Pictometry International Corp., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/142,436

(22) Filed: Dec. 27, 2013

(65) Prior Publication Data

US 2014/0111554 A1 Apr. 24, 2014

Related U.S. Application Data

(63) Continuation of application No. 13/781,090, filed on Feb. 28, 2013, which is a continuation of application No. 12/023,861, filed on Jan. 31, 2008, now Pat. No. 8,593,518.

(60) Provisional application No. 60/898,990, filed on Feb. 1, 2007.

(51) Int. Cl.
| | |
|---|---|
| *H04N 7/18* | (2006.01) |
| *G06T 3/20* | (2006.01) |
| *G06T 7/00* | (2006.01) |
| *G06T 11/60* | (2006.01) |
| *G06T 17/05* | (2011.01) |

(52) U.S. Cl.
CPC ............... *G06T 3/20* (2013.01); *G06T 7/0028* (2013.01); *G06T 11/60* (2013.01); *G06T 17/05* (2013.01); *H04N 7/18* (2013.01); *G06T 2207/10032* (2013.01); *G06T 2207/30184* (2013.01)

(58) Field of Classification Search
CPC .......... H04L 29/00; G06T 3/20; G06T 7/0028; G06T 11/60; G06T 17/05; G06T 2207/10032; G06T 2207/30184; H04N 7/18
USPC ......................................................... 348/144
See application file for complete search history.

(56) References Cited

U.S. PATENT DOCUMENTS

| | | | | |
|---|---|---|---|---|
| 6,477,268 B1 * | 11/2002 | Chiang | ................ | F04B 49/035 382/154 |
| 2005/0024517 A1 * | 2/2005 | Luciano | ................... | 348/333.03 |
| 2007/0024612 A1 * | 2/2007 | Balfour | ........................ | 345/419 |

(Continued)

OTHER PUBLICATIONS

European Patent Office; Supplementary European Search Report and European Search Opinion regarding European Patent Application No. 08728330.4; Mail Date Feb. 27, 2012.

(Continued)

*Primary Examiner* — Waseem Ashraf
*Assistant Examiner* — Keyvan Emdadi
(74) *Attorney, Agent, or Firm* — Dunlap Codding, P.C.

(57) ABSTRACT

A computer system for continuously panning oblique images is disclosed. More particularly, the computer system uses a methodology whereby separate oblique images are presented in a manner that allows a user to maintain an understanding of the relationship of specific features between different oblique images when panning.

21 Claims, 5 Drawing Sheets

(56) References Cited

U.S. PATENT DOCUMENTS

2007/0237420 A1* 10/2007 Steedly .................. G06K 9/32
                                                        382/284
2008/0231700 A1*  9/2008 Schultz et al. ................ 348/144

OTHER PUBLICATIONS

Applicant; Response to Supplementary European Search Report and European Search Opinion regarding European Patent Application No. 08728330.4; Sep. 26, 2012.
European Patent Office; Examination Report regarding European Patent Application No. 08728330.4; Mail Date Mar. 14, 2013.
Applicant; Response to Mar. 14, 2013 Examination Report regarding European Patent Application No. 08728330.4; Sep. 24, 2013.
European Patent Office; Examination Report regarding European Patent Application No. 08728330.4; mail date Mar. 6, 2015; and cited reference: Anonymous; "Virtual Earth/Live Maps: Dec. 2006", Microsoft Virtual Earth Blog, Dec. 19, 2006 (Dec. 19, 2006), pp. 1-12, XP55172730, Retrieved from the Internet: URL:https://web.archive.org/web/20080223093516/http://virtualearth.spaces.live.com/?__c11__BlogPart=BlogPart=blogview&__c=BlogPart&partqs=amonth%3d12%26ayear%3d2006 [retrieved on Feb. 27, 2015].
Applicant; Response to Mar. 6, 2015 Examination Report regarding European Patent Application No. 08728330.4; Jul. 16, 2015.

\* cited by examiner

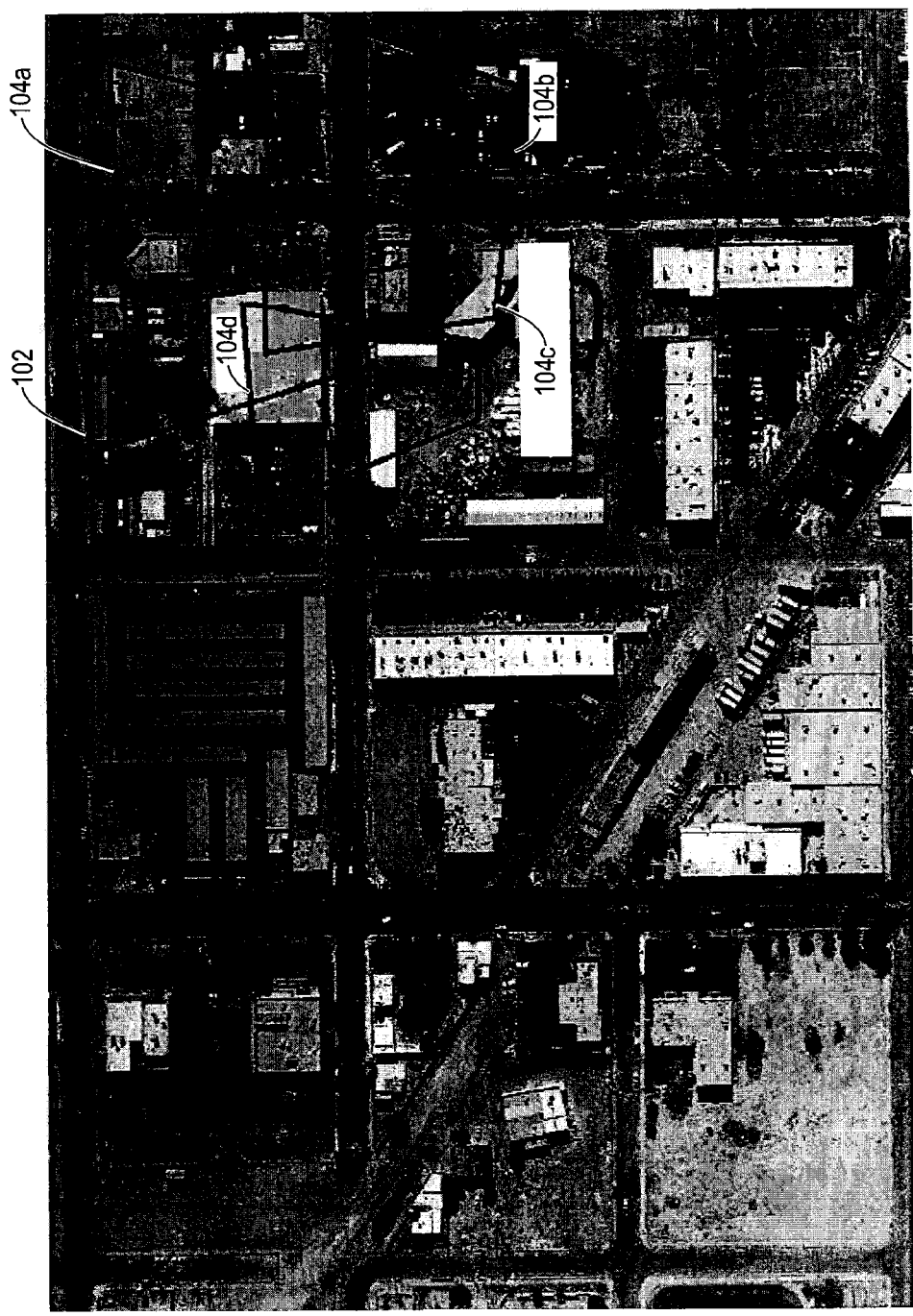

COMPUTER SYSTEM FOR CONTINUOUS OBLIQUE PANNING

INCORPORATION BY REFERENCE

The present patent application is a continuation of and claims priority to the patent application identified by U.S. Ser. No. 13/781,090, filed on Feb. 28, 2013, which claims priority to the patent application identified by U.S. Ser. No. 12/023,861, filed on Jan. 31, 2008, which claims priority to the provisional patent application identified by U.S. Ser. No. 60/898,990, filed on Feb. 1, 2007, the entire contents of which are hereby incorporated herein by reference.

FIELD OF INVENTION

The presently claimed and disclosed invention(s) relate to oblique images and methods for continuously panning the same. More particularly, the presently claimed and disclosed invention(s) use a methodology whereby separate obliquely captured images are panned in a continuous fashion.

BACKGROUND OF THE ART

In the remote sensing/aerial imaging industry, imagery is used to capture views of a geographic area and be able to measure objects and structures within the images as well as to be able to determine geographic locations of points within the image. These are generally referred to as "geo-referenced images" and come in two basic categories:

1. Captured Imagery—these images have the appearance they were captured by the camera or sensor employed.
2. Projected Imagery—these images have been processed and converted such that they confirm to a mathematical projection.

All imagery starts as captured imagery, but as most software cannot geo-reference captured imagery, that imagery is then reprocessed to create the projected imagery. The most common form of projected imagery is the ortho-rectified image. This process aligns the image to an orthogonal or rectilinear grid (composed of rectangles). The input image used to create an ortho-rectified image is a nadir image—that is, an image captured with the camera pointing straight down. It is often quite desirable to combine multiple images into a larger composite image such that the image covers a larger geographic area on the ground. The most common form of this composite image is the "ortho-mosaic image" which is an image created from a series of overlapping or adjacent nadir images that are mathematically combined into a single ortho-rectified image.

When creating an ortho-mosaic, this same ortho-rectification process is used, however, instead of using only a single input nadir image, a collection of overlapping or adjacent nadir images are used and they are combined to form a single composite ortho-rectified image known as an ortho-mosaic. In general, the ortho-mosaic process entails the following steps:

A rectilinear grid is created, which results in an ortho-mosaic image where every grid pixel covers the same amount of area on the ground.

The location of each grid pixel is determined from the mathematical definition of the grid. Generally, this means the grid is given an X and Y starting or origin location and an X and Y size for the grid pixels. Thus, the location of any pixel is simply the origin location plus the number of pixels times the size of each pixel.

In mathematical terms: $Xpixel=Xorigin+Xsize \times Columnpixel$ and $Ypixel=Yorigin+Ysize \times Rowpixel$.

The available nadir images are checked to see if they cover the same point on the ground as the grid pixel being filled. If so, a mathematical formula is used to determine where that point on the ground projects up onto the camera's pixel image map and that resulting pixel value is then transferred to the grid pixel.

Because the rectilinear grids used for the ortho-mosaic are generally the same grids used for creating maps, the ortho-mosaic images bear a striking similarity to maps and as such, are generally very easy to use from a direction and orientation standpoint.

However, since they have an appearance dictated by mathematical projections instead of the normal appearance that a single camera captures and because they are captured looking straight down, this creates a view of the world to which we are not accustomed. As a result, many people have difficulty determining what it is they are looking at in the image. For instance, they might see a yellow rectangle in the image and not realize what they are looking at is the top of a school bus. Or they might have difficulty distinguishing between two commercial properties since the only thing they can see of the properties in the ortho-mosaic is their roof tops, where as most of the distinguishing properties are on the sides of the buildings. An entire profession, the photo interpreter, has arisen to address these difficulties as these individuals have years of training and experience specifically in interpreting what they are seeing in nadir or orthomosaic imagery.

Since an oblique image, by definition, is captured at an angle, it presents a more natural appearance because it shows the sides of objects and structures—what we are most accustomed to seeing. In addition, because oblique images are not generally ortho-rectified, they are still in the natural appearance that the camera captures as opposed to the mathematical construction of the ortho-mosaic image.

This combination makes it very easy for people to look at something in an oblique image and realize what that object is. Photo interpretation skills are not required when working with oblique images. Oblique images, however, present another issue. Because people have learned navigation skills on maps, the fact that oblique images are not aligned to a map grid, like ortho-mosaic images, makes them much less intuitive when attempting to navigate or determine direction on an image. When an ortho-mosaic is created, because it is created to a rectilinear grid that is generally a map grid, the top of the orthomosaic image is north, the right side is east, the bottom is south, and the left side is west. This is how people are generally accustomed to orienting and navigating on a map. But an oblique image can be captured from any direction and the top of the image is generally "up and back," meaning that vertical structures point towards the top of the image, but that the top of the image is also closer to the horizon.

However, because the image can be captured from any direction, the horizon can be in any direction, north, south, east, west, or any point in between.

If the image is captured such that the camera is pointing north, then the right side of the image is east and the left side of the image is west. However, if the image is captured such that the camera is pointing south, then the right side of the image is west and the left side of the image is east. This can cause confusion for someone trying to navigate within the image. Additionally, because the ortho-mosaic grid is generally a rectilinear grid, by mathematical definition, the four cardinal compass directions meet at right angles (90-degrees). But with an oblique image, because it is still in the original form the camera captured and has not been reprojected into a mathematical model, it is not necessarily true that the compass directions meet at right angles within the image.

Because in the oblique perspective, you are moving towards the horizon as you move up in the image, the image covers a wider area on the ground near the top of the image as compared to the area on the ground covered near the bottom of the image. If you were to paint a rectangular grid on the ground and capture it with an oblique image, the lines along the direction the camera is pointing would appear to converge in the distance and the lines across the direction of the camera is pointing would appear to be more widely spaced in the front of the image than they do in the back of the image. This is the perspective view we are all used to seeing—things are smaller in the distance than close up and parallel lines, such as railroad tracks, appear to converge in the distance. By contrast, if an ortho-mosaic image was created over this same painted rectangular grid, it would appear as a rectangular grid in the ortho-mosaic image since all perspective is removed as an incidental part of the ortho-mosaic process.

Because a rectilinear grid is used to construct an ortho-mosaic image and the ortho-mosaic images are manufactured to provide a consistent perspective (straight down) it is possible to create the appearance of a continuous, seamless image by simply displaying such images adjacent to one another, or by overlapping them. Such an appearance allows users to remain oriented when navigating between images since the appearance and orientation of a road, building, or other feature remains very similar from one image to the next.

Because oblique images are not grid aligned and can be captured from any direction a feature on one image will not look the same on another image. This is due to several factors:

- The oblique perspective means that image pixels are not aligned on a rectangular grid but are aligned to the perspective that matches the perspective the camera has captured.
- The image pixels on an oblique image cannot measure the same size on the ground due to the perspective of the image. The area of ground covered by the pixels in the foreground of the image is smaller than the area of ground covered in the background of the image. Features in the foreground of an image will be a different size in the background of another image.
- The effect of building lean varies from image to image.
- The direction an edge of a feature travels across an image, such as the edge of a road or building, will vary between images.
- The captured portion of a feature will vary between images. For example: a particular image may contain the entire side of a building due to the head-on position of the capturing camera, but another image only captures a portion of the same side due to the capturing camera being at an angle relative to that side.

Because of these issues, the common practice in the industry is to provide oblique imagery as a series of individual images within which the user can pan. To see beyond the limits of an image the user needs to cause another image to be loaded; they can then pan within that image. This invention details a means to allow continuous panning of oblique images such that the above limitations are overcome.

SUMMARY OF INVENTION

This invention allows for separate obliquely captured images to be panned in a continuous fashion. In one embodiment, the presently disclosed and claimed invention is directed to a sequence of instructions stored on at least one computer readable medium for running on a computer system capable of displaying and navigating oblique imagery. The sequence of instructions includes:

instructions for displaying a pixel representation of a primary oblique image, the primary oblique image being part of a set of adjacent oblique images that represent an area of interest;

instructions for panning within the primary oblique image;

instructions for detecting a transition event of the primary oblique image;

instructions for selecting at least one adjacent secondary oblique image from the set of oblique images corresponding to a supplied location coordinate; and instructions for displaying the primary oblique image and the at least one adjacent secondary oblique image on the same display such that the features in the adjacent primary and secondary oblique images are aligned on the display.

In one embodiment, the sequence of instructions stored on the at least one computer readable medium further comprising instructions for translating at least the primary and secondary oblique images' pixel coordinates into location coordinates.

The transition event can be detected in a variety of manners. For example, the instructions for detecting a transition event may include instructions for (1) detecting the edge of the primary oblique image, (2) detecting the approach of an edge of the primary oblique image, or (3) detecting a pre-selected distance or number of pixels from the edge of the primary oblique image.

A variety of factors or selection criteria can be used to select the at least one secondary oblique image. For example, a current direction of travel or panning can be used to select at least one secondary oblique image, or a relative position of the supplied location coordinate within the secondary oblique image can be used to select at least one secondary oblique image. In addition, the instructions for selecting an adjacent secondary oblique image from the set of oblique images can be adapted to select multiple adjacent secondary oblique images that correspond to multiple location coordinates, and the instructions for displaying the primary and secondary oblique images on the same display can also include instructions for displaying multiple adjacent secondary oblique images on the same display.

In one embodiment, the oblique images are aerial oblique images. However, it should be understood that the oblique images can be other types of images, such as medical images, or architectural images.

The sequence of instructions can also further comprise instructions for causing a secondary oblique image to be a primary oblique image, as well as instructions for permitting a user to cause a secondary oblique image to be a primary oblique image.

In another version, the presently disclosed and claimed invention is directed to various methods. One of the methods is directed to using a sequence of instructions for displaying and navigating oblique imagery, In one version, the method comprises the steps of:

displaying a pixel representation of a primary oblique image on a display of a computer system, the primary oblique image being part of a set of oblique images representing an area of interest;

panning within the primary oblique image;

detecting a transition event; and displaying the primary oblique image and at least one adjacent secondary oblique image on the same display such that the features in the primary and adjacent secondary oblique images are aligned on the same display.

In another version, the invention is directed to a method for configuring a computer system for displaying oblique images representative of adjacent areas on a display. The method comprises the step of:

making a set of instructions on a computer readable medium accessible to a processor of a computer system, the set of instructions including instructions for:

displaying a pixel representation of a primary oblique image on a display of a computer system, the primary oblique image being part of a set of oblique images representing an area of interest;

panning within the primary oblique image;

detecting a transition event; and displaying the primary oblique image and the at least one adjacent secondary oblique image on the same display such that the features in the primary and at least one secondary oblique images are aligned on the same display.

In yet another version, the present invention is directed to a method for enhancing the ability of user(s) to display and navigate oblique imagery on a display of a computer system. The method comprises the step of:

selling and distributing a set of instructions for:

displaying a pixel representation of a primary oblique image on the display of the computer system, the primary oblique image being part of a set of oblique images representing an area of interest;

panning within the primary oblique image;

detecting a transition event; and displaying the primary oblique image and the at least one adjacent secondary oblique image on the same display such that the features in the present and at least one oblique images are aligned on the same display.

In yet another version, the invention is directed to a method for configuring a computer system having a display for displaying oblique images representative of adjacent areas. The method comprises the step of:

providing access to a set of instructions stored on a computer readable medium for installation on a computer readable medium associated with the computer system, the set of instructions including instructions for:

displaying a pixel representation of a primary oblique image on the display of the computer system, the primary oblique image being part of a set of oblique images representing an area of interest;

panning within the primary oblique image;

detecting the approach of an edge of the primary oblique image; and displaying the primary oblique image and the at least one adjacent secondary oblique image on the same display such that the features in the primary and at least one secondary oblique images are aligned on the same display.

BRIEF DESCRIPTION OF THE SEVERAL VIEWS OF THE DRAWINGS

FIG. 2 is a pictorial representation of a Master Image utilized in accordance with the present invention.

DETAILED DESCRIPTION OF THE PRESENTLY DISCLOSED AND CLAIMED INVENTION

Figure 1:
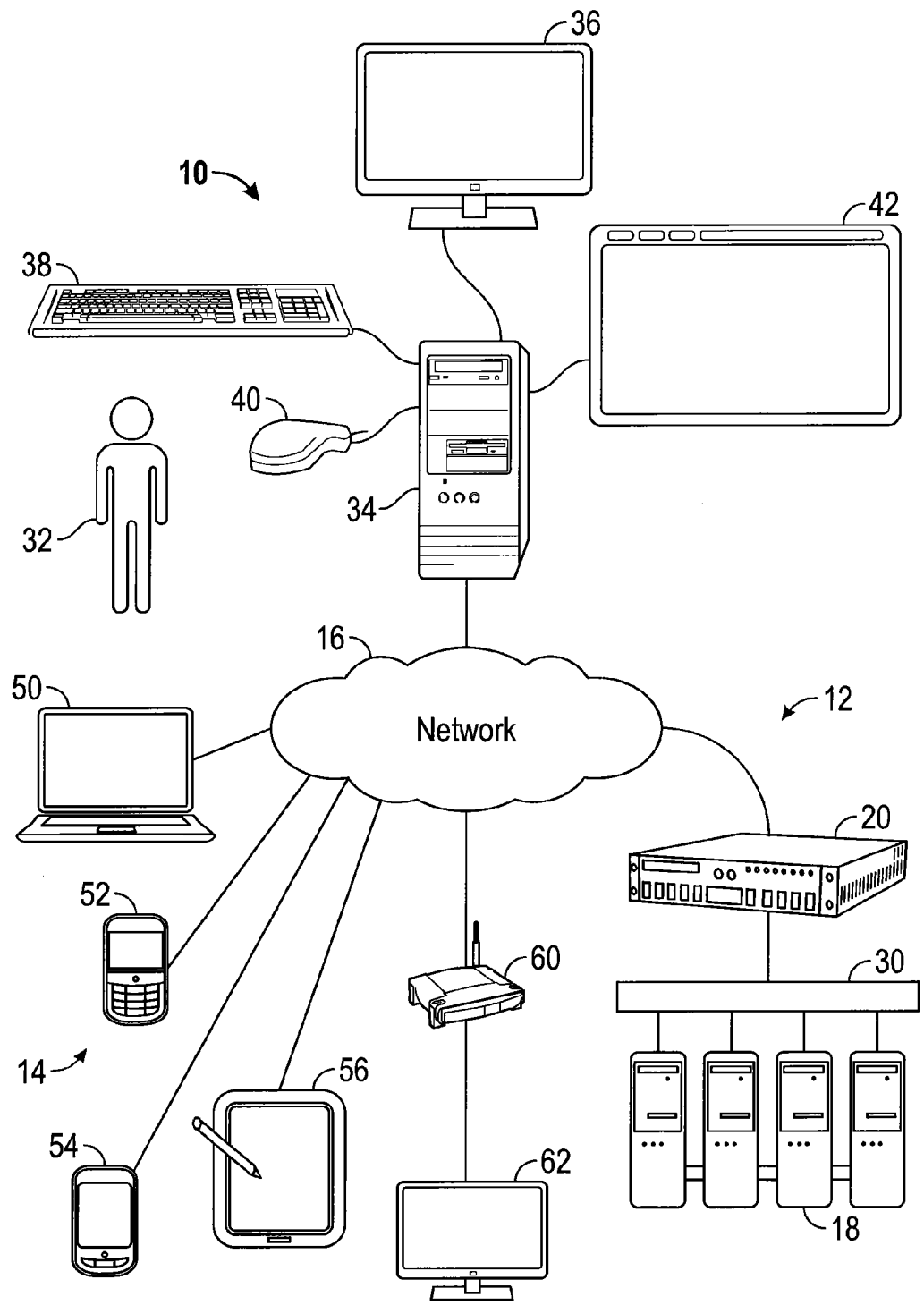
FIG. 1 is a schematic diagram of the hardware forming an exemplary embodiment of a computer system constructed in accordance with the present invention.

Before explaining at least one embodiment of the invention in detail, it is to be understood that the invention is not limited in its application to the details of construction, experiments, exemplary data, and/or the arrangement of the components set forth in the following description or illustrated in the drawings.

The invention is capable of other embodiments or of being practiced or carried out in various ways. Also, it is to be understood that the phraseology and terminology employed herein is for purpose of description and should not be regarded as limiting.

The presently claimed and disclosed invention(s) relate to oblique images and a computer system and methods for panning the same in a continuous fashion.

Terminology

Area of Interest—an area represented by a set of adjacent oblique images.

Master Image—an oblique, orthogonal, or nadir image that is used as a reference for organizing other images in the set.

Primary oblique image—a displayed oblique image that can be considered "in front of" the other displayed images. The primary oblique image can also be a master image.

Secondary oblique image—an oblique image that is not a Primary oblique image or a master image, but is referenced by a primary oblique image or a master image.

Transition—an act of visually changing the primary oblique image into a secondary oblique image and a secondary oblique image into a primary oblique image on a display of a computer system. This can include, and is not limited to: fading images; and directly replacing images.

Transition Event—An event that is detected to cause a Transition to take place. The Transition Event can include, but is not limited to: the act of Panning; or a user action such as a mouse click.

Navigation—an act of determining what image to display and what portion of an image to display based upon a set of coordinates.

Panning—an act of obscuring a currently displayed portion of an image and/or revealing a previously hidden portion of an image involving a visual shifting of the image.

Reference Indicator—A visual effect that is used to indicate a common area of interest between two or more images.

Edge—an extreme boundary of an image; typically having a top, a right side, a bottom, and a left side of the image.

Edge Indicator—A visual effect used to indicate the edge of an image. This definition can include, but is not limited to: rendering a portion of an image, or the entire image, in such a way as to distinguish it from another image (for example, converting an image to grayscale); the use of an arrow glyph to point to the image edge.

Feature—One or more captured objects in an image. Features can be used to maintain reference when a user is transitioning between images.

Computer System—a system or systems that are able to embody and/or execute the logic of the processes described herein. The logic embodied in the form of software instructions, or firmware may be executed on any appropriate hardware which may be a dedicated system or systems, or a personal computer system, or distributed processing computer system.

Computer Readable Medium—a device that can be read either directly or indirectly by a processor of a computer system. Examples of Computer Readable Mediums include an optical storage device, a magnetic storage device, an electronic storage device or the like.

DETAILED DESCRIPTION

Figure 3A:
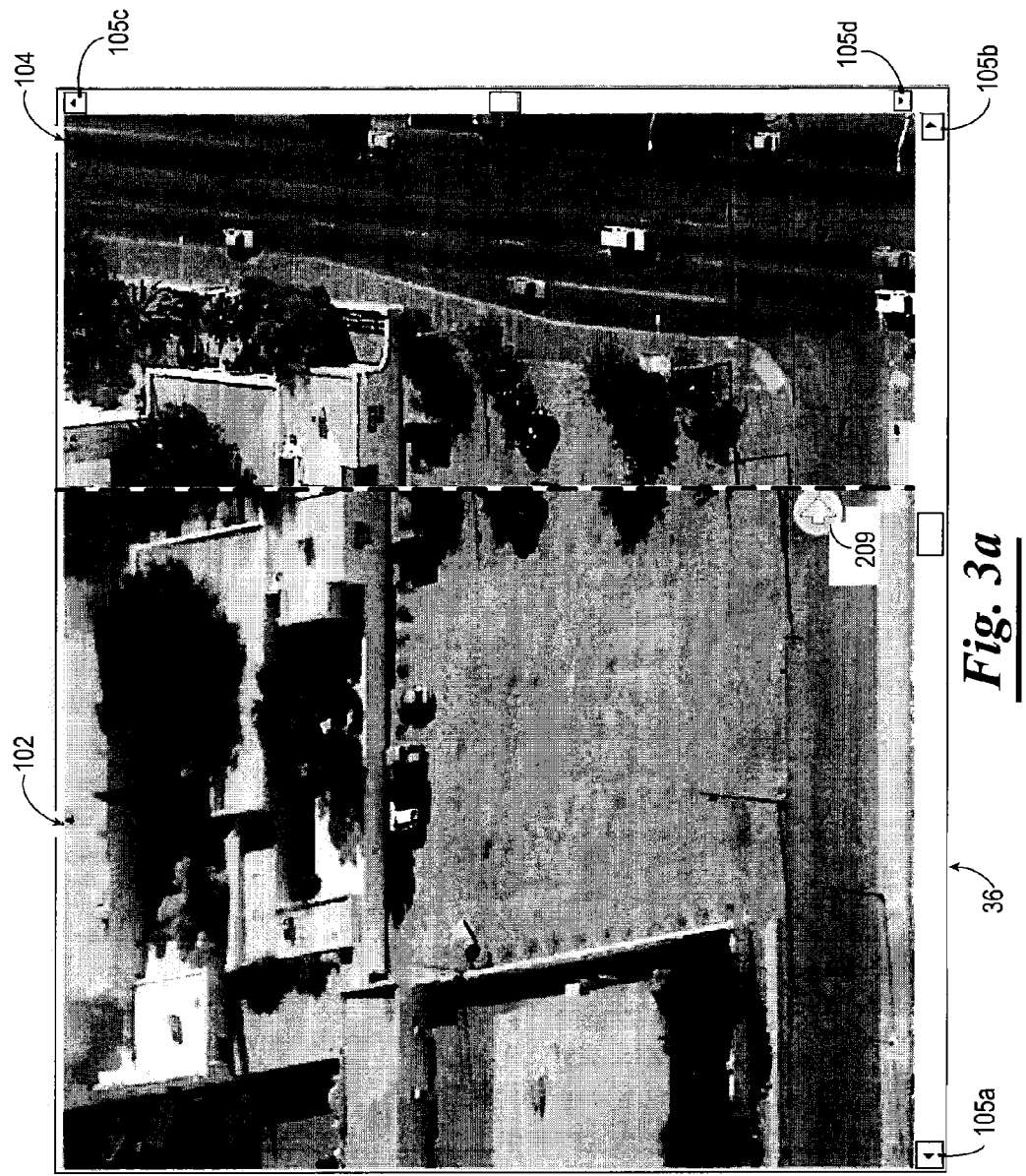
FIG. 3a is a pictorial representation of a primary oblique image and a secondary oblique image with an edge indicator consisting of a grayscale secondary oblique image and a Reference Indicator displayed.
Figure 3B:
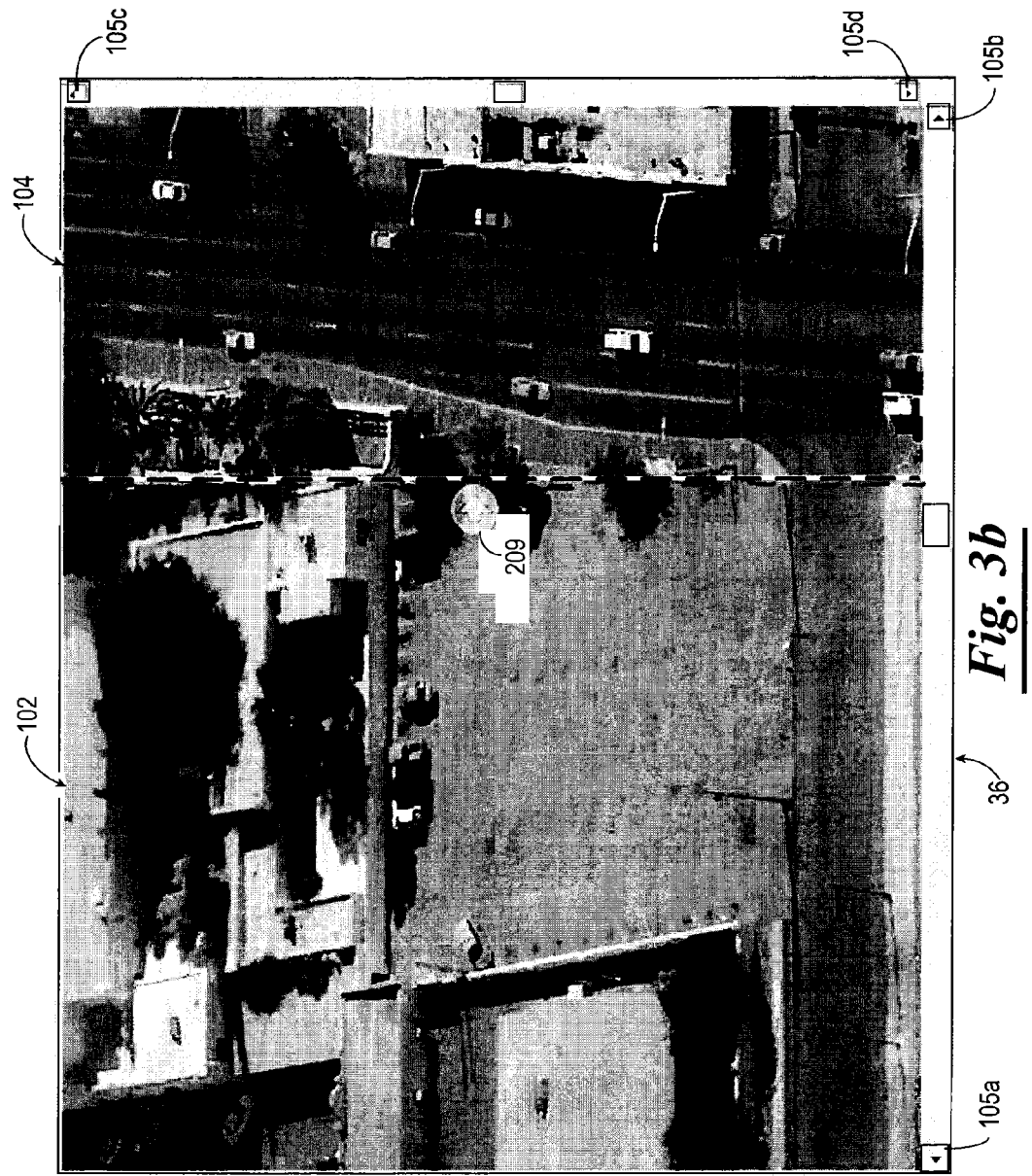
FIG. 3b is a pictorial representation of FIG. 3a after the location common to the two images has been changed.

Referring now to the drawings, and in particular to FIGS. 1, 2 and 3, shown therein and designated by a reference numeral 10 is an exemplary computer system constructed in accordance with the present invention.

Preferably, the computer system 10 is distributed, and includes a host system 12, communicating with one or more user devices 14 via a network 16. The network 16 can be the Internet or other network. In either case, the host system 12 typically includes one or more servers 18 configured to communicate with the network 16 via one or more gateways 20. When the network 16 is the Internet, the primary user interface of the computer system 10 is delivered through a series of web pages, but the primary user interface can be replaced by another type of interface, such as a Windows-based application. This method is also used when deploying the computer system 10 in a stand-alone environment such as a kiosk.

The network 16 can be almost any type of network although Internet and Internet 2 networks are preferred because of the wide support of their underlying technologies. The preferred embodiment of the network 16 exists in an Internet environment, which means a TCP/IP-based network. It is conceivable that in the near future, the preferred or other embodiments, may wish to use more advanced networking topologies.

The servers 20 can be networked with a LAN 30. The gateway 20 is an entity responsible for providing access between the LAN 30 and the network 16. The gateway 20 can also be used as a security means to protect the LAN 30 from attack from external networks such as the network 16.

The LAN 30 network can be based on a TCP/IP network such as the Internet, or it can be based on another underlying network transport technology. The preferred embodiment uses an Ethernet network with TCP/IP because of the availability and acceptance of underlying technologies, but other embodiments may use other types of networks such as Fibre Channel, SCSI, Gigabit Ethernet, etc.

As discussed above, in one preferred embodiment, the host system 12 includes the servers 18. The configuration of the server hardware will depend greatly upon the requirements and needs of the particular embodiment of the computer system 10. Typical embodiments, including the preferred embodiment, will include multiple servers 18 with load balancing to increase stability and availability. It is envisioned that the servers 18 will include database servers and application/web servers. The database servers are preferably separated from the application/web servers to improve availability and also to provide the database servers with improved hardware and storage.

The user devices 14 can be any number and type of devices. The most typical scenario of the user device 14 involves a user 32, using a computer 34 with a display 36, keyboard 38, and mouse 40. The display 36 can be a single monitor or multiple adjacent monitors. Typically, the user device 14 uses a type of software called a "browser" as indicated by a reference numeral 42 to render HTML/XHTML content that is generated when requesting resources from a source, such as the host system 12. In the preferred embodiment, the computer system 10 is designed to be compatible with major Web Browser vendors (Microsoft Internet Explorer, Netscape Navigator, and Opera). Other embodiments may wish to focus on one particular browser depending upon the common user base using the computer system 10.

The user devices 14 can also be implemented as a portable device such as a laptop computer 50 (or handheld computer); a cellular telephone 52 with a micro or embedded Web Browser; a Portable Digital Assistant 54 (PDA) capable of wireless network access; a pen-based or tablet computer 56. In another embodiment, the user device 14 can be a cable box 60 or other similar device for viewing through a display 62 or television. Current embodiments of computer system 10 can also be modified to use any of these or future developed devices.

The computer system 10 is designed in this way as to provide flexibility in its deployment. Depending upon the requirements of the particular embodiment, the Engine could be designed to work in almost any environment such as a desktop application, a web application, or even simply as a series of web services designed to communicate with an external application.

The hardware and system software are designed with two key concerns; flexibility and scalability. Although some specifics for software and hardware components may be mentioned herein, it will be understood that a wide array of different components could be substituted, such as using different database vendors or even replacing the databases with XML-based document stores.

When the computer system 10 is used to execute the logic of the processes described herein, such computer(s) and/or execution can be conducted at a same geographic location or multiple different geographic locations. Furthermore, the execution of the logic can be conducted continuously or at multiple discrete times.

In general, the computer system 10 is capable of displaying and navigating oblique imagery. An oblique image can be represented by a single pixel map, or by a series of tiled pixel maps that when aggregated recreate the image pixel map.

The computer system 10 will be described by way of example utilizing aerial images. However, it should be understood that the computer system 10 can use other types of images, such as medical images, or architectural images.

The computer system 10 includes one or more computer readable medium storing instructions for displaying a pixel representation of one or more master image 100 (FIG. 2), one or more primary oblique image 102 and one or more secondary oblique image 104 *a-d*. The master image(s) 100 is used as a reference for organizing other images in the set, and as shown in FIG. 2 may represent an area of interest including the primary oblique image(s) 102 and the secondary oblique image(s) 104 *a-d*. The computer readable medium can be a part of the host system 12, the user devices 14 or combinations thereof.

As shown in FIG. 2, in a preferred embodiment, the secondary oblique images 104 *a-d* overlap a portion of the primary oblique image 102, such that the overlapping portions of the primary oblique image 102 and secondary oblique images 104 *a-d* represent the same features of the area of interest. Thus, the primary oblique image(s) 102 and the secondary oblique image(s) 104 *a-d* are part of a set of adjacent oblique images cooperating to represent the area of interest or a portion of the area of interest.

The computer system 10 also includes instructions for (1) displaying a pixel representation of the primary and secondary oblique image on the display 36. (2) panning within the primary oblique image 102 as indicated by arrows 105*a-d*, (3) detecting a transition event of the primary oblique image 102, (4) selecting at least one adjacent secondary oblique image 104 *a-d* from the set of oblique images corresponding to a supplied location coordinate, and (5) displaying the primary oblique image 102 and the at least one adjacent secondary oblique image 104 *a-d* on the same display 36 such that the features in the adjacent primary oblique image 102 and secondary oblique images 104 *a-d* are aligned on the display 36. The instructions typically run on a combination of the user devices 14 and the host system 12.

The master image 100, primary oblique image 102, and secondary oblique image 104 *a-d* can be any type of images that have location coordinates or a measuring system stored with or associated with the images. For example, the master image 100, primary oblique image 102, and secondary oblique image 104 *a-d* can be medical images, architectural images or aerial images. The computer system 10 uses one or more databases or servers 18 (see FIG. 1) to store the master image 100, primary oblique image 102, and secondary oblique image 104 *a-d* in an organized format. The master image 100, primary oblique image 102, and secondary oblique image 104 *a-d* can use any color space, and be stored in any industry supported file format, such as TIFF, JPEG, TARGA, GIF, BMP, ECW or the like.

As described hereinabove, panning oblique images in a continuous manner is fraught with problems and unlikely to provide a useable means of navigation using the current state of the art. Therefore, in order to allow continuous panning of oblique images a new process must be performed. Such an improved and unique process is described and claimed herein and preferably uses, generally, the following considerations:

The use of a particular portion of the master image 100 to generate one or more geographic locations that are subsequently used to determine a set of oblique images representing the locations.

The use of geographic locations to determine the positioning of one or more secondary oblique images 104 *a-d* relative to a primary oblique image 102 to ensure that at least one feature in the primary oblique image 102 is displayed on the secondary oblique image 104 *a-d*.

The use of visual effects to distinguish an edge of the primary oblique image 102 from any secondary oblique images 104 *a-d*.

The use of visual effects to indicate where on a primary oblique image 102 and secondary oblique image 104 *a-d* the point of interest is located.

The use of a Transition Event to cause a transition to take place between one or more primary oblique images 102 and one or more secondary oblique images 104 *a-d*.

The simultaneous display of one or more primary oblique image 102 and/or secondary oblique images 104 *a-d* or portions of those images.

In practice, the methodology disclosed and claimed herein, consists of multiple steps and data transformations that can be accomplished by one of ordinary skill in the art given the present specification. Either instructions running on the host system 12 or the instructions running on the user devices 14 can detect transition event(s).

Figure 4:
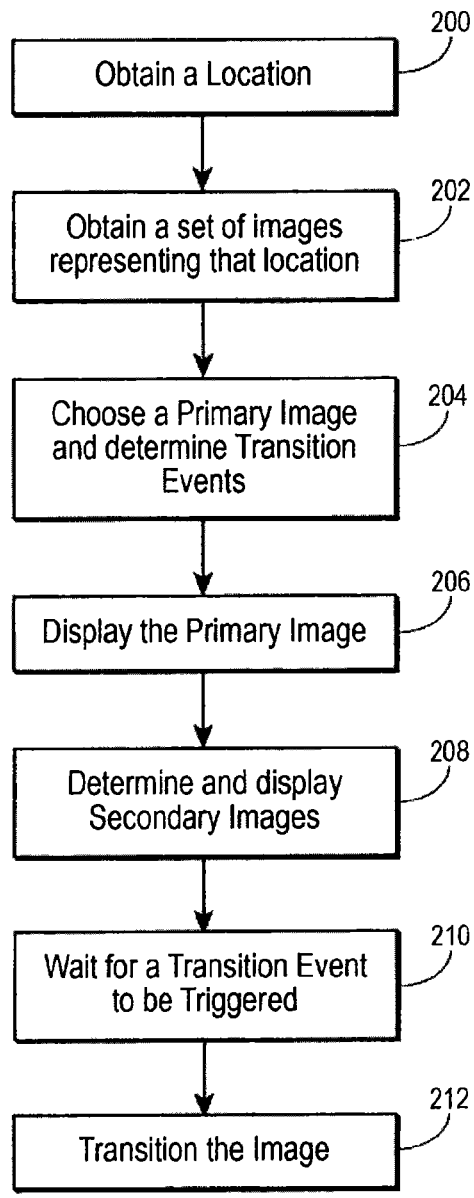
FIG. 4 is an illustration of an exemplary software/function flow chart of a method for continually panning oblique images.

Referring to FIG. 4, the first step 200 in handling continuous panning with oblique images is to obtain a relevant geographic location. Once the geographic location is obtained, a set of images representing that location is then obtained, which is the second step 202. The images can be obtained from the database servers 18 discussed above. The relevant geographic location can be obtained internally, through calculating a position based upon a mathematical formula, or through an external entity, such as a database or user input. In the preferred embodiment, a user indicates an initial geographic location. Subsequent locations are mathematically calculated using image boundaries and other Transition Events.

The third step 204 is to make a determination of which image from the obtained set best represents the geographic location and make that image the primary oblique Image 102 (FIG. 2). Once the primary oblique Image 102 has been determined one or more Transition Events are determined. In some cases, the computer system 10 acts immediately, for example, on a Transition Event to determine and display secondary oblique images 104 *a-d* (FIG. 2) as described below. The transition events can take a variety of forms, such as but not limited to:

a specific portion of a primary oblique image 102 is calculated to be displayed ("front loading"), or is displayed.

an edge of the primary oblique image 102 or a preselected distance or number of pixels from the edge of the primary oblique image 102.

defined by the user either ahead of time or though some action on the user's part in "real time".

A region of the display area not covered by a primary oblique image 102.

The fourth step 206 is to display the primary oblique image 102; whereas the fifth step 208 is to determine and display the secondary oblique images 104 *a-d*. Usually, secondary oblique Images 104 *a-d* are displayed when the primary oblique image 102 doesn't provide sufficient coverage for the area of interest; but this is not a requirement. When secondary oblique Images 104 *a-d* are provided the following steps are taken:

A geographic location (e.g. a supplied location coordinate) is chosen that is common to both the primary oblique image 102 and a set of secondary oblique images 104 *a-d*.

A determination of the best secondary oblique image 104 *a-d* for that location is made based on algorithmic selection. The algorithmic selection is made based upon a variety of factors, such as one or more selection criteria. If multiple selection criteria are used, the selected selection criteria can be combined either directly (indicating which are in or out of the selection set) or with predetermined weighting factors which indicate which selection criterion is more important to the selection process. These factors or selection criteria include, but are not limited to: the location of the secondary oblique image 104 (e.g., the geographic location) or the location coordinates contained in the secondary oblique image, the direction from which the secondary oblique image 104 was taken, i.e., the orientation of the secondary oblique image, the ground sample distance of the pixels within the secondary oblique image 104, image type, the date and/or time the secondary oblique image was captured, the distance from the edge of the location coordinate within the secondary oblique image 104, the relative position of the supplied location coordinate within the secondary oblique image, the current direction of travel or panning in relation to the secondary oblique image, the nearness of orientation of the secondary oblique image to the primary oblique image, the size of the secondary oblique image, the capture spectra of the secondary oblique image, the image quality of the secondary oblique image, the nearness of metadata information of the secondary oblique image to the metadata information of the primary oblique image, or the vertical position of the location on the secondary oblique image 104. Which selection criteria or factors to use and how to combine them is predetermined based on the use of the system 10 and the needs of the users of the system 10.

The best secondary oblique image 104 a-d is displayed in such a way that one or more common geographic locations on both images are displayed adjacent to each other.

An Edge Indicator 209 is displayed to show where the primary oblique image 102 ends and the secondary oblique image begins 104 a-d.

If one secondary oblique image 104 a-d also doesn't provide sufficient coverage, the Step 208 is repeated for those areas lacking sufficient coverage until there is sufficient coverage.

The sixth step 210 is to wait for a Transition Event to be triggered. The seventh step 212 is to transition images when a Transition Event is triggered. The user triggers a Transition Event by performing an action that indicates they wish to view a previously hidden portion of an oblique image. There are two ways of satisfying this request:

1. Scroll the primary oblique image 102 and use secondary oblique Images 104 a-d as needed to provide sufficient coverage as aforementioned.
2. Cause a new image to be the primary oblique image 102, position the image appropriately and provide sufficient coverage as needed with secondary oblique Images 104 a-d as aforementioned.

The display of a new primary oblique image 102 can be accomplished through several techniques. Some, but not all of these techniques are listed below. In the preferred embodiment, the gradual transitioning method is preferred.

Draw the new primary oblique image 102 over the existing images with no transitions.

Perform a rollback transition where the old primary oblique image 102 appears to be rolled to the side and the newly exposed area is filled with the new primary oblique image.

Gradually transition by fading-out (make less visible) the old primary oblique image 102 and simultaneously fade-in (make more visible) the new primary oblique image 102.

The purpose of transitioning the primary oblique images 102 is to allow the user to visually maintain a clear sight of the image features they are using for geographic referencing.

There is a special case of panning that makes use of the currently displayed images through the manipulation of the common geographic location between a primary oblique image 102 and secondary oblique image 104 a-d. It is helpful, but not necessary, to display the Reference Indicator 209 to assist the user in determining where on the images the common locations are. Through the manipulation of the Reference Indicator 209, or some other means, the common location can be changed causing the displayed images to be updated to maintain the adjacent display of the common location. Due to the nature of oblique images the act of displaying the common location will cause panning to occur, obscuring or revealing portions of an oblique image.

Thus, in use, the computer system 10 starts with the primary oblique image (i.e., the primary oblique image 102) that has location information, such as a geographic position, and as the user causes the primary oblique image 102 to pan across the display 36 and reaches a transition event, such as the edge of the primary oblique image 102, the instructions running on the computer system 10 automatically determine which secondary oblique image 104 a-d lies along the edge of the primary oblique image 102 and opens the secondary oblique image 104 a-d. Then, the instructions running on the computer system 10 position the secondary oblique image 104 a-d on the display such that the features in the adjacent primary oblique image 102 and secondary oblique images 104 a-d are aligned on the display.

Although the foregoing invention has been described in some detail by way of illustration and example for purposes of clarity of understanding, it will be obvious to those skilled in the art that certain changes and modifications may be practiced without departing from the spirit and scope thereof, as described in this specification and as defined in the appended claims below.

What is claimed is:

1. A sequence of instructions stored on at least one non-transitory computer readable medium for running on a computer system capable of displaying and navigating oblique imagery, comprising:
    instructions for displaying on a display a pixel representation of a primary oblique image, the primary oblique image being part of a set of adjacent oblique images that partially, but not completely, overlap and-represent an area of interest;
    instructions for panning within the primary oblique image, the primary oblique image including overlapping data;
    instructions for detecting a transition event, triggered by a user panning within the primary oblique image, of the displayed primary oblique image;
    instructions for selecting an adjacent secondary oblique image from the set of oblique images corresponding to a supplied location coordinate; and
    instructions for displaying the adjacent secondary oblique image in response to the detection of the transition event on the display by gradually transitioning between the primary and the adjacent secondary oblique image.

2. The sequence of instructions stored on the at least one non-transitory computer readable medium of claim 1, wherein the instructions for displaying the adjacent secondary oblique image draws the adjacent secondary oblique image over the primary oblique image.

3. The sequence of instructions stored on the at least one non-transitory computer readable medium of claim 1 further comprising instructions for translating at least the primary and secondary oblique images' pixel coordinates into location coordinates.

4. The sequence of instructions stored on the at least one non-transitory computer readable medium of claim 1, wherein the instructions for detecting the transition event include instructions for detecting an edge of the primary oblique image.

5. The sequence of instructions stored on the at least one non-transitory computer readable medium of claim 1, wherein the instructions for detecting the transition event include instructions for detecting an approach of an edge of the primary oblique image.

6. The sequence of instructions stored on the at least one non-transitory computer readable medium of claim 1, wherein the instructions for detecting the transition event include instructions for detecting a pre-selected distance or number of pixels from an edge of the primary oblique image.

7. The sequence of instructions stored on the at least one non-transitory computer readable medium of claim 1, wherein a current direction of travel or panning is used to select the adjacent secondary oblique image.

8. The sequence of instructions stored on the at least one non-transitory computer readable medium of claim 1, wherein a relative position of the supplied location coordinate within the adjacent secondary oblique image is used to select the adjacent secondary oblique image.

9. The sequence of instructions stored on the at least one non-transitory computer readable medium of claim 1, wherein the set of oblique images is aerial oblique images.

10. The sequence of instructions stored on the at least one non-transitory computer readable medium of claim 1, wherein the instructions for selecting the adjacent secondary oblique image from the set of oblique images selects multiple adjacent secondary oblique images that correspond to multiple location coordinates.

11. The sequence of instructions stored on the at least one non-transitory computer readable medium of claim 1, wherein the instructions for displaying the adjacent secondary oblique image are configured to cause a rollback transition wherein the primary oblique image appears to be rolled to a side and a newly exposed area is filled with the adjacent secondary oblique image.

12. The sequence of instructions stored on the at least one non-transitory computer readable medium of claim 1, wherein the instructions for displaying the adjacent secondary oblique image are configured to cause a gradual transition by fading-out the primary oblique image.

13. The sequence of instructions stored on the at least one non-transitory computer readable medium of claim 12, wherein the instructions for displaying the adjacent secondary oblique image are configured to cause the primary oblique image to fade-out and simultaneously cause the adjacent secondary oblique image to fade-in.

14. A method of using a sequence of instructions for displaying and navigating oblique imagery, comprising:
  displaying a pixel representation of a primary oblique image on a display of a computer system, the primary oblique image being part of a set of oblique images that partially, but not completely, overlap and represent an area of interest;
  panning within the primary oblique image, the primary oblique image including overlapping data;
  detecting a transition event, triggered by a user panning within the primary oblique image, and related to the displayed primary oblique image; and
  displaying an adjacent secondary oblique image on the display of the computer system by gradually transitioning between the primary and the adjacent secondary oblique image from the set of oblique images responsive to the detection of the transition event.

15. The method of claim 14, wherein the step of displaying is defined further as displaying the adjacent secondary oblique image by causing the primary oblique image to fade-out and causing the adjacent secondary oblique image to fade-in.

16. A method for configuring a computer system for displaying oblique images representative of adjacent areas on a display, comprising the step of:
  making a set of instructions on a non-transitory computer readable medium accessible to a processor of the computer system, the set of instructions including instructions for:
    displaying a pixel representation of a primary oblique image on the display of the computer system, the primary oblique image being part of a set of oblique images that partially, but not completely, overlap and represent an area of interest;
    panning within the primary oblique image, the primary oblique image including overlapping data;
    detecting a transition event, triggered by a user panning within the primary oblique image; and
    displaying an adjacent secondary oblique image from the set of oblique images by gradually transitioning between the primary and the adjacent secondary oblique image responsive to the detection of the transition event.

17. The method of claim 16, wherein features in the primary and at least one secondary oblique images are aligned.

18. A method for enhancing an ability of users to display and navigate oblique imagery on a display of a computer system, comprising the step of:
  distributing a set of instructions stored on a non-transitory computer readable medium for:
    displaying a pixel representation of a primary oblique image on the display of the computer system, the primary oblique image being part of a set of oblique images that partially, but not completely, overlap and represent an area of interest;
    panning within the primary oblique image, the primary oblique image including overlapping data;
    detecting a transition event, triggered by a user panning within the primary oblique image; and
    displaying at least one adjacent secondary oblique image from the set of oblique images on the display responsive to the detection of the transition event.

19. The method of claim 18, wherein the step of displaying is defined further as displaying the adjacent secondary oblique image by causing the primary oblique image to fade-out and causing the adjacent secondary oblique image to fade-in.

20. A method for configuring a computer system having a display for displaying oblique images representative of adjacent areas, comprising the step of:
  providing access to a set of instructions stored on a first non-transitory computer readable medium for installation on a second non-transitory computer readable medium associated with the computer system, the set of instructions including instructions for:
    displaying a pixel representation of a primary oblique image on the display of the computer system, the primary oblique image being part of a set of oblique images that partially, but not completely, overlap and represent an area of interest;

panning within the primary oblique image, the primary oblique image including overlapping data;

detecting an approach of an edge of the primary oblique image while panning within the primary oblique image; and displaying an adjacent secondary oblique image from the set of oblique images on the display responsive to the detection of the approach of the edge.

21. The method of claim 20, wherein features in the primary oblique image and the adjacent secondary oblique images are aligned.

* * * * *